United States Patent
Morton et al.

(10) Patent No.: US 7,089,961 B2
(45) Date of Patent: Aug. 15, 2006

(54) FLUID ENERGY REDUCTION DEVICE

(75) Inventors: Karen Margaret Morton, Huddersfield (GB); Jonathan Martin Lodge, Huddersfield (GB)

(73) Assignee: Weir Valves & Controls UK Limited (GB)

( * ) Notice: Subject to any disclaimer, the term of this patent is extended or adjusted under 35 U.S.C. 154(b) by 324 days.

(21) Appl. No.: 10/221,864

(22) PCT Filed: Mar. 14, 2001

(86) PCT No.: PCT/GB01/01124
§ 371 (c)(1),
(2), (4) Date: Mar. 31, 2003

(87) PCT Pub. No.: WO01/69114
PCT Pub. Date: Sep. 20, 2001

(65) Prior Publication Data
US 2005/0104023 A1    May 19, 2005

(30) Foreign Application Priority Data
Mar. 16, 2000 (GB) .................................. 0006337.0

(51) Int. Cl.
*F16K 47/04* (2006.01)
(52) U.S. Cl. ................ 137/625.3; 137/625.33
(58) Field of Classification Search ............ 137/625.3, 137/625.33, 625.37, 625.38, 625.39
See application file for complete search history.

(56) References Cited

U.S. PATENT DOCUMENTS

| 4,212,321 | A | | 7/1980 | Hulsey | |
|---|---|---|---|---|---|
| 4,398,563 | A | * | 8/1983 | Kay et al. ..................... | 138/42 |
| 4,938,450 | A | * | 7/1990 | Tripp et al. .............. | 251/30.03 |
| 5,687,763 | A | * | 11/1997 | Steinke .................. | 137/625.33 |
| 6,161,584 | A | * | 12/2000 | Hemme et al. ........ | 137/625.37 |

FOREIGN PATENT DOCUMENTS

| EP | 0039995 | 11/1981 |
|---|---|---|
| EP | 0487163 | 5/1992 |
| EP | 0838622 | 4/1998 |
| GB | 1569251 | 6/1980 |

* cited by examiner

*Primary Examiner*—John Fox
(74) *Attorney, Agent, or Firm*—Woodard, Emhardt, Moriarty, McNett & Henry LLP

(57) ABSTRACT

A fluid energy reduction device especially for a flow control valve has a fluid inlet and a fluid outlet separated by a plurality of stacked plates in the form of a trim stack. Each plate of the stack has a plurality of rows of discrete, spaced columns that extend to the plate above in the stack. Fluid flowing through the trim stack is obstructed by the columns and is forced to divide into a plurality of subordinate flow paths. The rows of columns are staggered in such a way that fluid downstream of the first row of columns is incident directly on columns of the next row. The arrangement provides for the smooth pressure drop and energy reduction in the fluid without cavitation, noise or vibration.

18 Claims, 5 Drawing Sheets

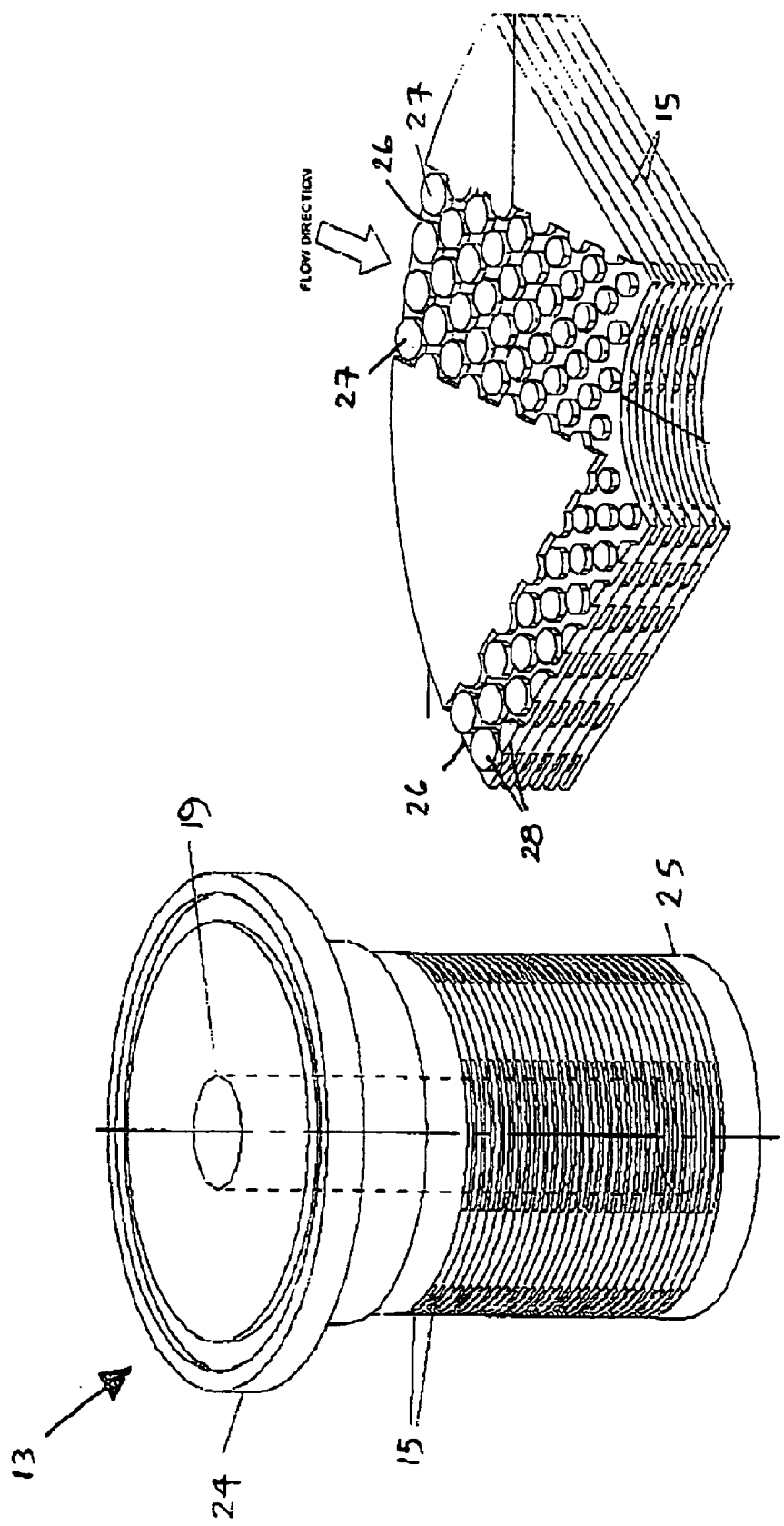

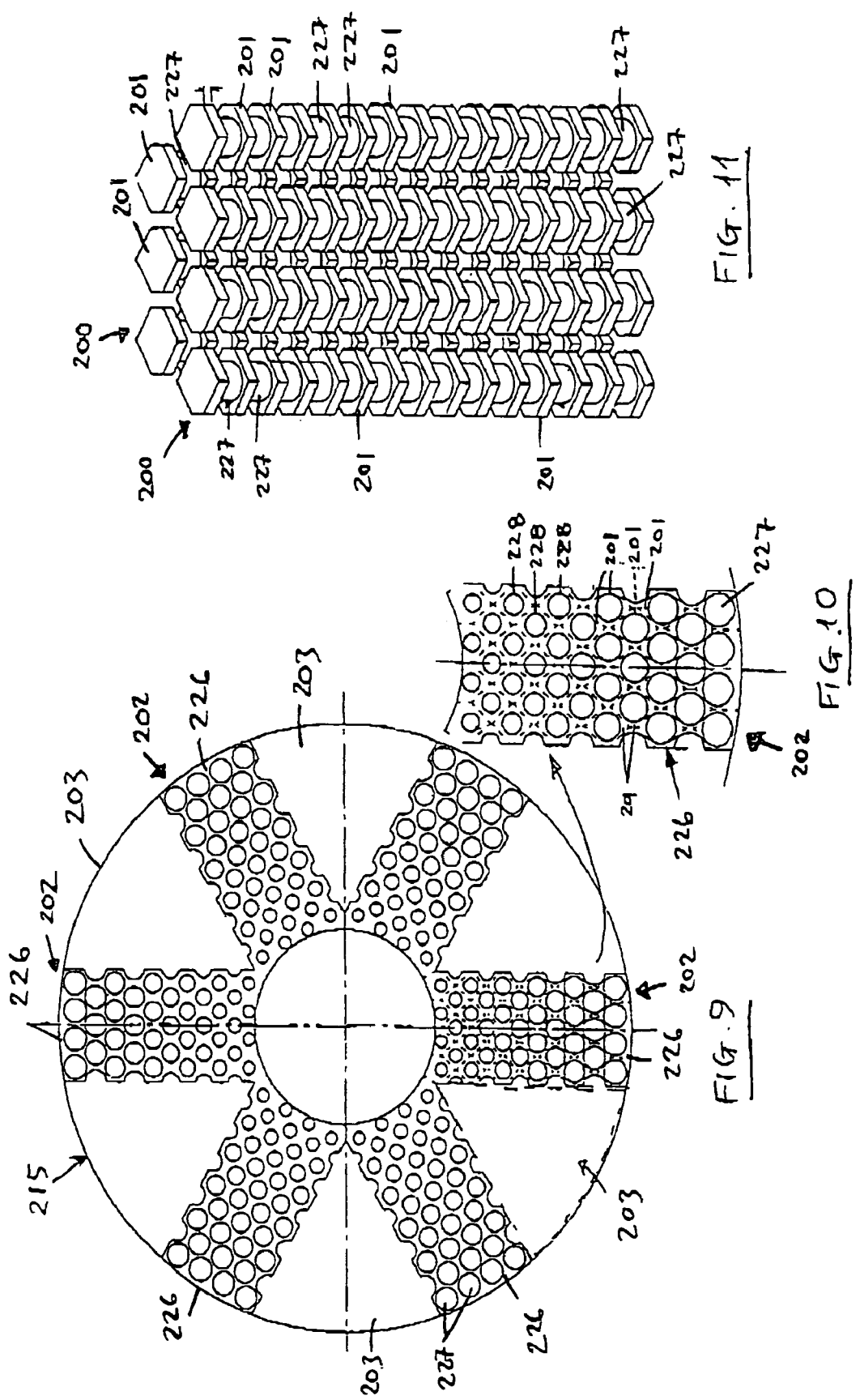

FLUID ENERGY REDUCTION DEVICE

The present invention relates to a fluid energy reduction device and to a valve or regulator in which fluid passing therethrough is subjected to a pressure drop and energy reduction by a such a device.

It is known in high pressure fluid flow control systems to have control devices that are designed to effect a pressure drop in the fluid passing therethrough. For a given fluid pressure drop across such a device there is a corresponding increase in fluid velocity that must be carefully managed. Moreover, pressure drops occurring at high fluid flow rates in valves or the like are generally accompanied by other problems such as erosion, noise, vibration and cavitation.

A common solution to the above problems is to divide the flow through the device into a plurality of separate streams, each of which is in the form of a tortuous path. The fluid pressure and energy of the fluid is partially dissipated along such paths as a result of losses caused by friction between walls of the path, rapid changes in fluid direction and expansion or contraction chambers.

In fluid control valves such control devices usually take the form of a stack of discs or a plurality of concentric cylindrical sleeves. In the former design the fluid path is defined by tortuous passages machined into one or both facing surfaces of adjacent discs. In the latter design the sleeves are radially perforated with the perforations of adjacent sleeves being offset to cause the fluid to flow in a tortuous path. The sleeves may be separated by intermediate annular passages which allow the fluid passing therethrough to expand before it then has to contract to pass through the perforations of the next sleeve. The specific geometric arrangement of such designs can be configured as desired to allow the pressure of the fluid of each stream to drop in relatively small increments and in many stages.

Examples of fluid control devices of the kind described above are disclosed in U.S.-RE-32,197, GB-A-2335054 and U.S. Pat. No. 5,390,896.

Valves of the kind described above are generally fitted with a plug that is movable within a central cylindrical cavity defined in the discs or inside the innermost of the concentric sleeves. The plug is axially movable within the cavity to close or open the exits to the fluid paths so as to vary the number of paths that are available for fluid flow in accordance with the flow characteristics required by die user.

Although such fluid control devices are effective their construction and therefore manufacture and assembly is complex and expensive. Moreover, the presence of tortuous paths with sharp bends increases the tendency for clogging and erosion caused by the presence of small particles (such as dirt, sand, grit and other detritus) in the fluid flow.

It is an object of the present invention to obviate or mitigate the aforesaid disadvantages.

According to a first aspect of the present invention there is provided a fluid energy reduction device comprising a fluid inlet and a fluid outlet separated by a plurality of stacked plates between adjacent pairs of which are defined fluid flow paths, wherein at least one of the paths is divided into subordinate paths by a plurality of rows of discrete, spaced flow obstructing members that extend between adjacent plates.

By using flow obstructing members the fluid is presented with several alternative paths and the absence of a single tortuous path with areas of fluid recirculation reduces or eliminates the problem of erosion by detritus in the fluid flow.

The flow obstructing members may have any convenient shape in cross section and may vary in shape across the plate although in preferred embodiments at least part of the surface of the obstructing member in the fluid flow path is arcuate to allow smooth passage of fluid flow around the obstructing member. The flow obstructing members, being spaced and discrete, serve to separate incident fluid into separate streams that then pass around the obstructing member and recombine downstream before being separated again when incident on an obstructing member in a subsequent row. The separation and convergence of the flow together with the usual frictional drag effects cause a smooth pressure drop and therefore energy reduction in the fluid. By increasing the number of rows the repeated separation and convergence imparts a greater pressure reduction.

In a preferred embodiment the flow obstructing members of one row are offset laterally from those of an adjacent row in the direction of fluid flow. This arrangement is designed to ensure that the downstream flows of fluid from one row are directed to be incident directly on the obstructing members of the subsequent row.

The flow obstructing members may be formed on the surface of each plate and may be integral therewith. In an alternative embodiment the plates and flow obstructing members are defined by an assembly of elongate members whose configuration comprises plate elements interspersed axially along the length of the elongate member with the flow obstructing members, the plate elements of adjacent elongate members combining to form said plate when said elongate members are assembled.

In one preferred embodiment the flow obstructing members are generally circular in cross section and decrease in cross section area from row to row in the direction of fluid flow from inlet to outlet. In another preferred embodiment the flow obstructing members increase in cross sectional area from inlet to outlet.

Each plate may have a plurality of spaced flow paths defined thereon.

In a preferred embodiment the plates are annular and have a central circular aperture. The rows of flow obstructing members are annular and arranged in a concentric configuration. The plate may be divided into a plurality of angularly spaced radially extending flow paths.

According to a second aspect of the present invention there is provided a fluid control valve comprising a fluid energy reduction device of the kind defined above and a valve control member reciprocally disposed in said device.

Specific embodiments of the present invention will now be described, by way of example only, with reference to the accompanying drawings in which:

FIG. 2 is a perspective view of a valve trim stack of FIG. 1;

FIG. 3 is a perspective view from above of a cut-away section of the trim stack of FIG. 2;

FIG. 9 is a plan view of an alternative embodiment of a disc of a trim stack in accordance with the present invention;

FIG. 10 is a close up view of part of the disc of FIG. 9; and

FIG. 11 is a perspective view of the construction of part of trim stack using a plurality of the discs shown in FIG. 9.

Figure 1:
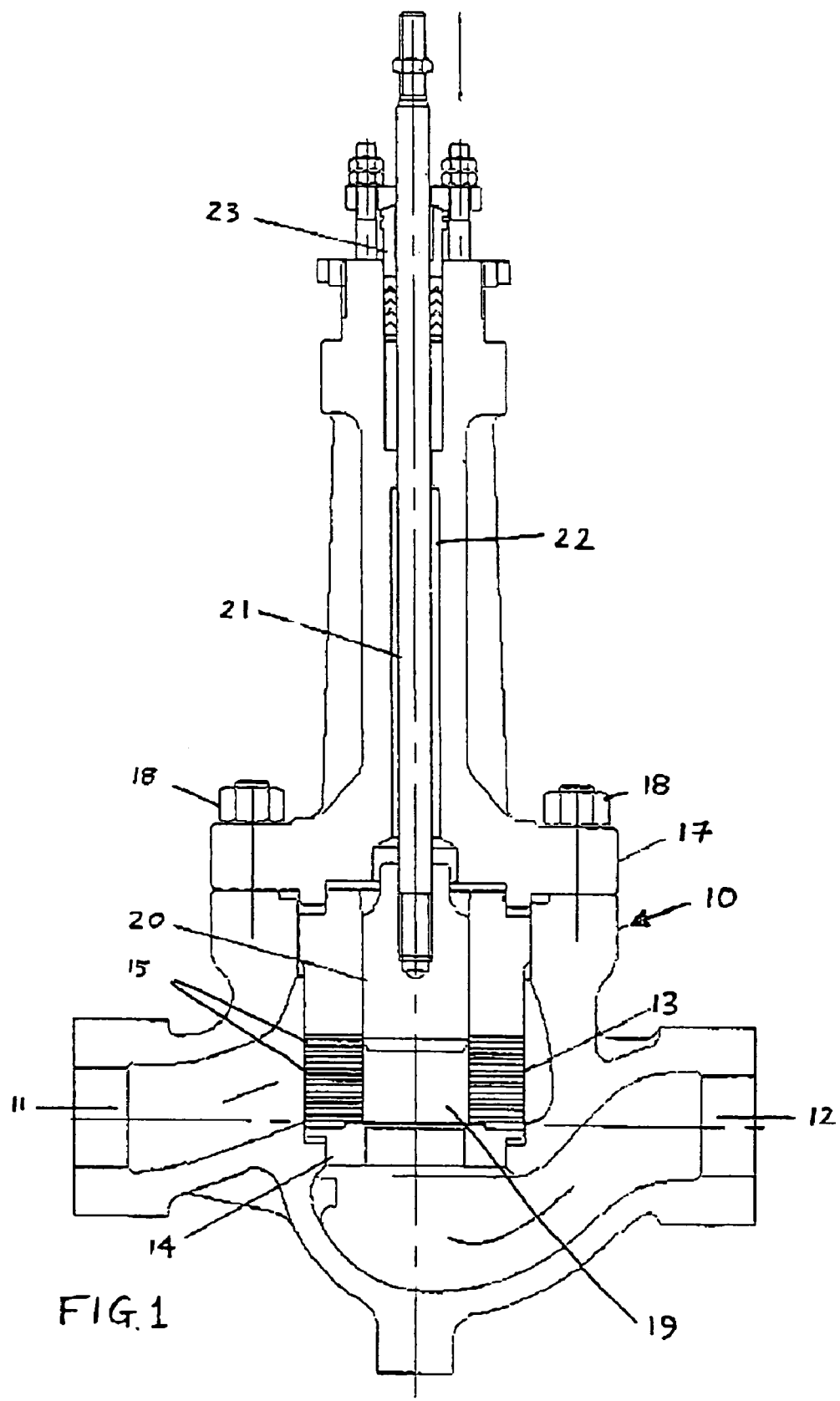
FIG. 1 is a longitudinal section through a fluid control valve fitted with a fluid energy reduction device of the present invention.

Referring now to FIG. 1 of the drawings, the control valve comprises a valve body 10 defining inlet and outlet conduits 11, 12 that in use are connected to pipes (not shown) that transport the fluid to and from the valve. The valve is intended to be bi-directional in that the direction of fluid flow can be the reverse of that shown in the figures. The choice of fluid flow direction is dependent on the particular application.

Between the inlet and outlet conduits 11, 12 the housing defines a generally circular central chamber in which is removably received a trim stack 13. The stack 13 is disposed on a valve seat 14 and comprises a plurality of coaxial plate-like discs 15 (described in detail below) of identical size, each disc 15 having a central circular aperture 16. A valve cover 17 is fixed to the valve body 10 by bolts 18 so as to close the chamber and retain the stack 13 in place.

In combination the stack of discs define a cylindrical bore 19 in which a reciprocal plug 20 is slidably disposed. The plug 20 is attached to one end of an elongate stem 21 that extends upwardly through a bore 22 in the cover 17 via a guide seal 23 and is reciprocal by means of an actuator (not shown) connected to the other end of the stem 21 and to the exterior of the valve cover 17.

The plug 20 is selectively moveable in an axial direction between a fully open position in which fluid flowing through the valve from the inlet to outlet conduits 11, 12 passes through the trim stack 13, and a closed position where it is in abutment with the valve seat 14 and blocks flow through the stack 13. Between these two positions the plug 20 acts as a throttle by permitting only a predetermined volume of fluid flow and thereby determining the characteristics of the valve performance.

The trim stack 13 is shown in more detail in FIG. 2. The stacked discs-15 are retained between upper and lower stack plates 24, 25 that are configured to fit the corresponding mating surfaces of the valve seat 14 and valve body 10.

As can be seen from FIG. 3 each disc 15 in the stack 13 has a plurality of radial flow passages 26 equi-angularly spaced around its surface. Each passage 26 is in the form of a rectilinear duct cut into the surface of the disc 15. Projecting from the bottom surface of the duct is a plurality of discrete spaced columns 27 formed integrally in the disc 15 in concentric annular rows 28. In the exemplary embodiment shown in FIG. 3 the columns 27 are circular in cross section and reduce in cross sectional area from row to row in the fluid flow direction (indicated by the arrow). The columns 27 are staggered in such a way that those of any particular row 28 are circumferentially offset from those in the preceding and subsequent rows. The discs 15 may be machined into or cast in this configuration.

Figure 4:
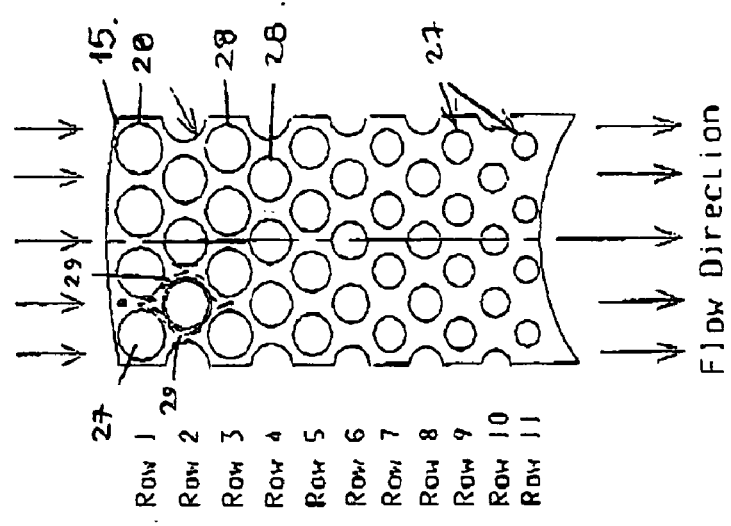
FIG. 4 is diagrammatic representation of fluid flow through a part of a disc of the trim stack of FIG. 2.

The fluid flow into the trim stack 13 is incident on the first row 28 of columns 27 in each passage 26 and is divided into a plurality of smaller flow paths 29 that pass between adjacent columns 27 as can be seen in FIG. 4. As the fluid progresses to subsequent rows 28 it is again forced to divide as it passes around the front of the column 27. However, there is a convergence of the smaller flows 29 downstream of the column 27. The staggering of the columns between adjacent rows is designed to direct the downstream fluid flow from between the columns of one row directly into the path of a column of the next row. This constant fluid flow separation, subsequent recombination and the frictional drag between the fluid and the curved surfaces of the columns 27 serves to reduce the energy and therefore pressure of the fluid in stages thereby providing a smooth pressure drop across the trim stack 13.

Figure 5:
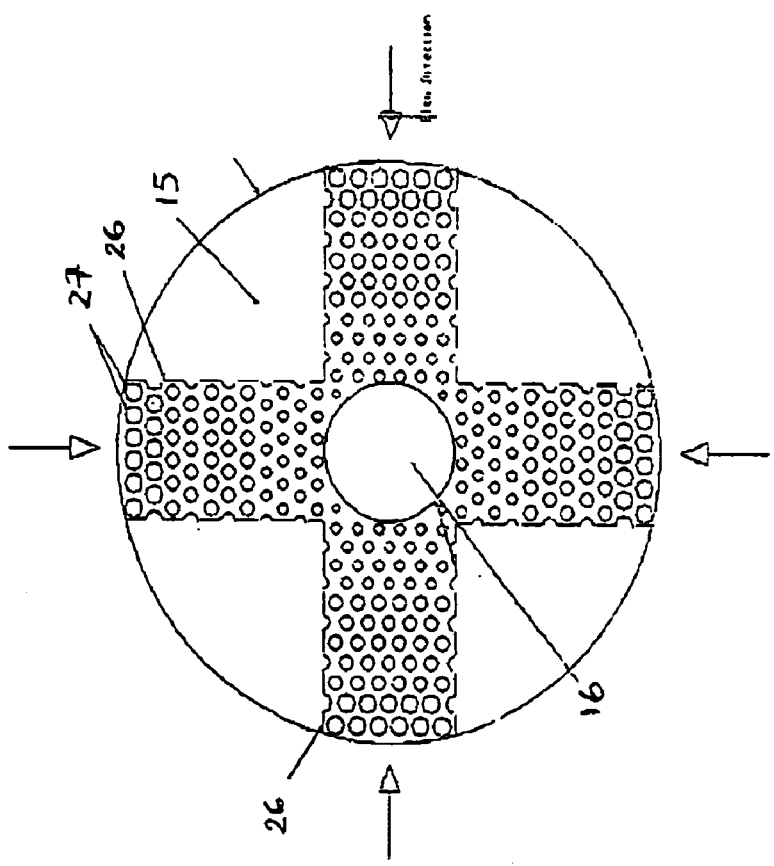
FIG. 5 is diagrammatic representation in plan of one embodiment fluid flow through a disc of the trim stack.
Figure 6:
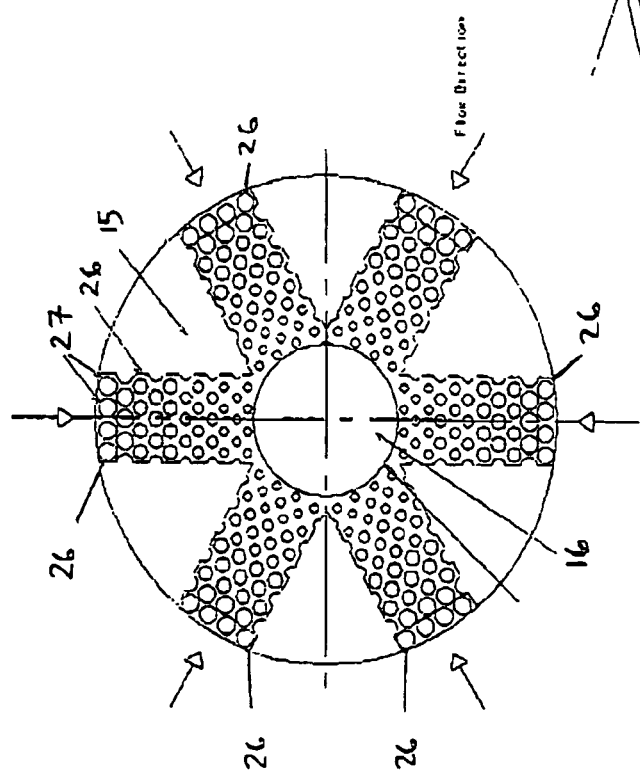
FIG. 6 is a diagrammatic representation in plan of an alternative embodiment of fluid flow through a disc of the trim stack.

It is to be appreciated that the specific design of the trim stack discs 15 can be varied according to the particular application, the flow direction and the flow characteristics that are required. Examples of discs with four and six radial passages are shown in FIGS. 5 and 6 respectively. The spacing between columns 27 may increase from row to row in applications where it is necessary to increase the fluid flow area through the flow passage 26.

Figure 8:
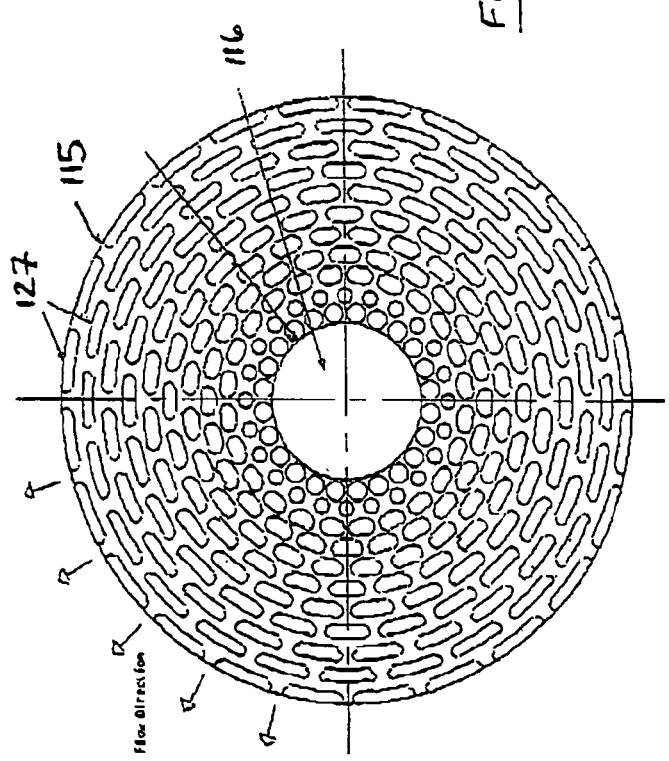
FIG. 8 is a plan view of a disc from the trim stack of FIG. 7.
Figure 7:
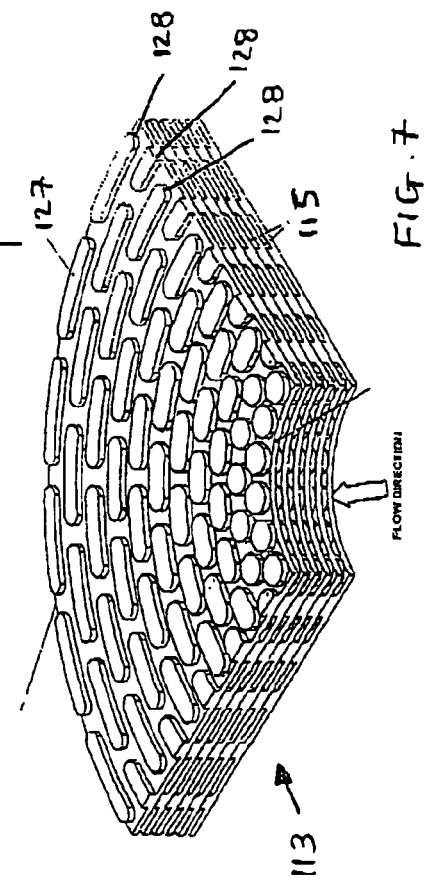
FIG. 7 is a perspective view from above of a cut away section—of an alternative embodiment of the trim stack.

An alternative embodiment of the surface configuration of the disc is shown in FIGS. 7 and 8 in which parts corresponding to those of FIGS. 3 and 4 are represented by the same reference numerals increased by 100 and are not described except insofar as they differ from their counterparts. In this embodiment the fluid flow direction is reversed. The disc 115 surface is not divided into separate passages and columns 127 are disposed over the full surface of the disc 115. The columns 127 vary in cross sectional shape from row to row 128 and become progressively elongated (into lozenge shapes) in the circumferential direction towards the outer periphery of the disc 115. The arrangement of the columns 127 and their distortion is designed to maintain the required flow area and resistance across the trim stack 113.

Referring now back to FIGS. 1 to 3, as the valve plug 20 is moved up or down the central bore 19 it covers or uncovers the fluid passages 26 in each disc 15 so as to increase or reduce fluid communication between the inlet and outlet conduits 11, 12.

A further alternative embodiment is shown in FIGS. 9 to 11 in which the flow passages in the trim stack are each formed by a plurality of machined bars. Parts corresponding to those of FIGS. 3 and 4 are represented by the same reference numerals increased by 200 and are not described except insofar as they differ from their counterparts Each bar 200 comprises, in vertical array, a plurality of hexagonal segments 201 interspersed by cylindrical columns 227. When the bars 200 are assembled into groups the hexagonal segments 201 at a given vertical level on each bar combine to form the base walls of the fluid passage ducts 226 for a given tier of the stack 213 and the columns 227 provide the same function as those described above in relation to FIGS. 3 to 6. The thickness of each hexagonal segment 201 is the same as the thickness of the discs 15 at the flow ducts 26 described above. The groups of bars 200 are assembled into rectangular blocks 202 and are interspersed by solid cylindrical segments 203 of metal so as to complete the trim stack 213. The whole assembly is held together by a cage (not shown).

It will be appreciated that numerous modifications to the above-described design may be made without departing from the scope of the invention as defined in the appended claims. For example, although the trim stack is depicted in the accompanying drawings as generally cylindrical other shapes may be used. Moreover the columns of any of the embodiments can be of any suitable cross section shape and divided into any number of separate passages. The number of rows of columns on each disc is determined by the pressure drop required across the trim stack, the higher the pressure drop required the greater the number of rows required to dissipate energy safely within the trim stack. The columns need not be integral with the discs but may alternatively comprise pins or pegs that are received in through bores or blind holes in the disc surface. The single pin or peg may pass through one or more discs to provide columns that ale common to one or more discs in the stack.

The invention claimed is:

1. A fluid energy reduction device comprising a fluid inlet and a fluid outlet separated by a plurality of stacked plates between adjacent pairs of which are defined fluid flow paths, each plate having a plurality of discrete, spaced flow paths defined thereon, wherein at least one of the paths is divided into subordinate paths by a plurality of rows of discrete, spaced flow-obstructing members that extend between adjacent plates; wherein the fluid flow paths defined by each adjacent pair of stacked plates are independent of the fluid flow paths defined by other adjacent pairs of stacked plates.

2. A fluid energy reduction device according to claim 1, wherein the obstructing members of one row are laterally offset from those of an adjacent row in the direction of the fluid flow path.

3. A fluid energy reduction device according to claim 2, wherein at least part of a surface of the obstructing members in the fluid flow path is arcuate so as to allow smooth passage of fluid flow therearound.

4. A fluid energy reduction device according to claim 1, wherein at least part of a surface of the obstructing members in the fluid flow path is arcuate so as to allow smooth passage of fluid flow therearound.

5. A fluid energy reduction device according to claim 1, wherein the obstructing members are generally circular in cross section.

6. A fluid energy reduction device according to claim 1, wherein the cross-sectional area of the obstructing members increases across the rows from inlet to outlet.

7. A fluid energy reduction device according to claim 1, wherein the cross-sectional area of the obstructing members decreases across the rows from inlet to outlet.

8. A fluid energy reduction device according to claim 1, wherein the flow obstructing members are formed on a surface of each plate.

9. A fluid control valve comprising a fluid energy reduction device according to claim 1 and a valve control member reciprocally disposed in said device.

10. A fluid energy reduction device according to claim 1, wherein the plates are annular and have a central circular aperture.

11. A fluid energy reduction device comprising a fluid inlet and a fluid outlet separated by a plurality of stacked plates between adjacent pairs of which are defined fluid flow paths, each plate having a plurality of spaced flow paths defined thereon, wherein at least one of the paths is divided into subordinate paths by a plurality of rows of discrete, spaced flow-obstructing members that extend between adjacent plates; wherein the plates and flow obstructing members are defined by an assembly of elongate members, each elongate member having along its length plate elements interspersed with said flow obstructing members, the plate elements of adjacent elongate members combining to form said plate when the elongate members are assembled.

12. A fluid energy reduction device according to claim 11, wherein the elongate members are assembled in parallel.

13. A fluid energy reduction device according to claim 12, wherein each plate has a plurality of spaced flow paths defined thereon.

14. A fluid energy reduction device according to claim 13, wherein the plates are annular and have a central circular aperture.

15. A fluid energy reduction device according to claim 14, wherein the plate is divided into a plurality of angularly spaced radially extending flow paths.

16. A fluid energy reduction device comprising a fluid inlet and a fluid outlet separated by a plurality of stacked plates between adjacent pairs of which are defined fluid flow paths, each plate having a plurality of spaced flow paths defined thereon, wherein at least one of the paths is divided into subordinate paths by a plurality of rows of discrete, spaced flow-obstructing members that extend between adjacent plates; wherein the obstructing members of one row are laterally offset from those of an adjacent row in the direction of the fluid flow path; and further wherein at least part of a surface of the obstructing members in the fluid flow path is arcuate so as to allow smooth passage of fluid flow therearound; wherein the obstructing members are generally circular in cross section; wherein the cross-sectional area of the obstructing members varies across the rows from inlet to outlet; wherein the flow obstructing members are formed on a surface of each plate; and, wherein the plates and flow obstructing members are defined by an assembly of elongate members, each elongate member having along its length plate elements interspersed with said flow obstructing members, the plate elements of adjacent elongate members combining to form said plate when the elongate members are assembled.

17. A fluid energy reduction device according to claim 16; wherein the cross-sectional area of the obstructing members decreases across the rows from inlet to outlet.

18. A fluid energy reduction device according to claim 16, wherein the cross-sectional area of the obstructing members increases across the rows from inlet to outlet.

* * * * *

UNITED STATES PATENT AND TRADEMARK OFFICE
CERTIFICATE OF CORRECTION

| | | |
|---|---|---|
| PATENT NO. | : 7,089,961 B2 | Page 1 of 1 |
| APPLICATION NO. | : 10/221864 | |
| DATED | : August 15, 2006 | |
| INVENTOR(S) | : Karen Margaret Morton and Jonathan Martin Lodge | |

It is certified that error appears in the above-identified patent and that said Letters Patent is hereby corrected as shown below:

<u>Title page,</u>
Item (75), Inventors: please delete the name and address of Jonathan Martin Lodge, Huddersfield (GB)

Signed and Sealed this

Twenty-seventh Day of May, 2008

JON W. DUDAS
*Director of the United States Patent and Trademark Office*